(12) United States Patent
Kim et al.

(10) Patent No.: US 9,529,136 B2
(45) Date of Patent: Dec. 27, 2016

(54) BACKLIGHT UNIT AND DISPLAY APPARATUS HAVING THE SAME

(71) Applicant: Samsung Display Co., Ltd., Yongin, Gyeonggi-do (KR)

(72) Inventors: Donghoon Kim, Suwon-si (KR); Seung-Mo Kim, Seongnam-si (KR); Byungchoon Yang, Seoul (KR); Hayoung Lee, Seoul (KR); Seunghwan Chung, Asan-si (KR); HanMoe Cha, Anyang-si (KR); Youngjun Choi, Yongin-si (KR); Jinsung Choi, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 519 days.

(21) Appl. No.: 13/790,665

(22) Filed: Mar. 8, 2013

(65) Prior Publication Data

US 2014/0119049 A1    May 1, 2014

(30) Foreign Application Priority Data

Oct. 26, 2012  (KR) .................. 10-2012-0119717

(51) Int. Cl.
  *F21V 7/04* (2006.01)
  *F21V 8/00* (2006.01)
(52) U.S. Cl.
  CPC .................................... *G02B 6/005* (2013.01)
(58) Field of Classification Search
  CPC ..................................................... G02B 6/005
  USPC .................. 362/97.1–97.3, 600, 607, 615
  See application file for complete search history.

(56) References Cited

U.S. PATENT DOCUMENTS

| 2008/0012031 | A1  | 1/2008  | Jang et al. |
| 2010/0208493 | A1  | 8/2010  | Choi et al. |
| 2010/0283072 | A1  | 11/2010 | Kazlas et al. |
| 2011/0309325 | A1* | 12/2011 | Park et al. ............ 257/13 |
| 2012/0008065 | A1  | 1/2012  | Im et al. |
| 2012/0113671 | A1  | 5/2012  | Sadasivan et al. |

FOREIGN PATENT DOCUMENTS

| JP | 2008-021988  | 1/2008 |
| JP | 2012-022028  | 2/2012 |
| JP | 2012-099863  | 5/2012 |
| KR | 1020120009686 | 2/2012 |

(Continued)

*Primary Examiner* — Andrew Coughlin
*Assistant Examiner* — Meghan Ulanday
(74) *Attorney, Agent, or Firm* — F. Chau & Associates, LLC

(57) ABSTRACT

A backlight unit includes a light source unit having a light source configured to emit a first light, a quantum dot sheet configured to emit a second light having a different color from the first light, a light guide plate configured to guide a light exiting from the light source unit or the quantum dot sheet, and an optical member including a prism sheet and configured to control the light exiting from the light guide plate. The quantum dot sheet includes a polymer resin and a plurality of first and second quantum dots, which are dispersed in the polymer resin. The second light is a white light obtained by mixing a red light, green light, and a blue light, and the second light has a concordance rate with an Adobe RGB color space which is no less than by about 99.9%.

11 Claims, 5 Drawing Sheets

(56) References Cited

FOREIGN PATENT DOCUMENTS

| KR | 1020120061539 | 6/2012 |
|----|---------------|--------|
| KR | 1020120063929 | 6/2012 |
| KR | 1020120066322 | 6/2012 |

\* cited by examiner

BACKLIGHT UNIT AND DISPLAY APPARATUS HAVING THE SAME

CROSS-REFERENCE TO RELATED APPLICATION

This application claims priority to Korean Patent Application No. 10-2012-0119717, filed on Oct. 26, 2012, the disclosure of which is hereby incorporated by reference herein in its entirety.

TECHNICAL FIELD

The present disclosure relates to a backlight unit and a display apparatus having the same. More particularly, the present disclosure relates to a backlight unit capable of increasing a display quality and a display apparatus having the same.

DISCUSSION OF THE RELATED ART

In general, a liquid crystal display, which is not self-emissive, allows an external light to pass through a display panel including a color filter, thereby displaying a desired image. As the external light, a natural light, e.g., sunlight, a surrounding light, e.g., light from lighting fixtures, or light from a backlight unit is used. The backlight unit may include, for example, a light emitting diode as its light source. The light emitting diode has been spotlighted as the light source of the backlight unit as it has various properties, such as, for example, small size, low power consumption, high reliability, etc.

Meanwhile, to realize a full color image, a backlight unit that includes a plurality of light emitting diodes emitting lights with different colors has been researched. However, color stains may occur on a light incident portion and a corner portion of a light guide plate when the backlight unit includes a plurality of light emitting diodes emitting lights with different colors.

In addition, as a full-width half-maximum of the light emitted from each light emitting diode is relatively wide, it may be difficult to realize the desired image.

SUMMARY

Exemplary embodiments of the present invention provide a backlight unit capable of increasing display quality.

Exemplary embodiments of the present invention provides a display apparatus having the backlight unit.

Exemplary embodiments of the present invention provide a backlight unit including a light source unit that includes a light source configured to emit a first light, a quantum dot sheet configured to emit a second light having a different color from the first light, a light guide plate configured to guide a light exiting from the light source unit or the quantum dot sheet, and an optical member that includes a prism sheet and configured to control the light exiting from the light guide plate. The quantum dot sheet includes a polymer resin and a plurality of first quantum dots and a plurality of second quantum dots, which are dispersed in the polymer resin. The second light is a white light obtained by mixing a red light, a green light, and a blue light, and the second light has a concordance rate with an Adobe RGB color space, which is no less than about 99.9%.

The light source is configured to emit the blue light, and the blue light has a center wavelength in a range from about 440 nm to about 460 nm and a full-width half-maximum no greater than about 45 nm. The first quantum dots are configured to emit the green light, and the green light has a center wavelength in a range from about 530 nm to about 534 nm and a full-width half-maximum no greater than about 31 nm. The second quantum dots are configured to emit the red light, and the red light has a center wavelength no less than about 629 nm and a full-width half-maximum no greater than about 35 nm.

Exemplary embodiments of the present invention provide a display apparatus including a display panel and a backlight unit configured to provide a light to the display panel. The backlight unit includes a light source unit including a light source configured to emit a first light, a quantum dot sheet configured to emit a second light having a different color from the first light, a light guide plate configured to guide a light exiting from the light source unit or the quantum dot sheet to the display panel and an optical member including a prism sheet and configured to control the light exiting from the light guide plate. The quantum dot sheet includes a polymer resin and a plurality of first quantum dots and a plurality of second quantum dots, which are dispersed in the polymer resin. The second light is a white light obtained by mixing a red light, a green light, and a blue light, and the second light has a concordance rate with an Adobe RGB color space, which is no less than about 99.90%.

Exemplary embodiments of the present invention provide a display apparatus including a display panel and a backlight unit configured to provide a light to the display panel. The backlight unit includes a light source unit that includes a light source configured to emit a first light, a quantum dot sheet configured to emit a second light having a different color from the first light, a light guide plate configured to guide a light exiting from the light source unit or the quantum dot sheet to the display panel, and an optical member that includes a prism sheet and is configured to control the light exiting from the light guide plate. The quantum dot sheet includes a polymer resin and a plurality of first quantum dots and a plurality of second quantum dots, which are dispersed in the polymer resin. A center wavelength range of a red light emitted by the quantum dot sheet overlaps with a center wavelength of a light transmitting through a red color filter disposed on the display panel by no less than about 70%, and a center wavelength range of a green light emitted by the quantum dot sheet overlaps with a center wavelength of a light transmitting through a green color filter disposed on the display panel by no greater than about 10%.

According to exemplary embodiments of the present invention, the backlight unit provides the light to the display panel, which has a concordance ratio of no less than about 99.9% with the Adobe RGB color space. Thus, the display apparatus employing the backlight unit may increase the display quality thereof.

BRIEF DESCRIPTION OF THE DRAWINGS

Exemplary embodiments of the present invention can be understood in more detail from the following detailed description when considered in conjunction with the accompanying drawings wherein.

DETAILED DESCRIPTION OF EXEMPLARY EMBODIMENTS

Figure 1:
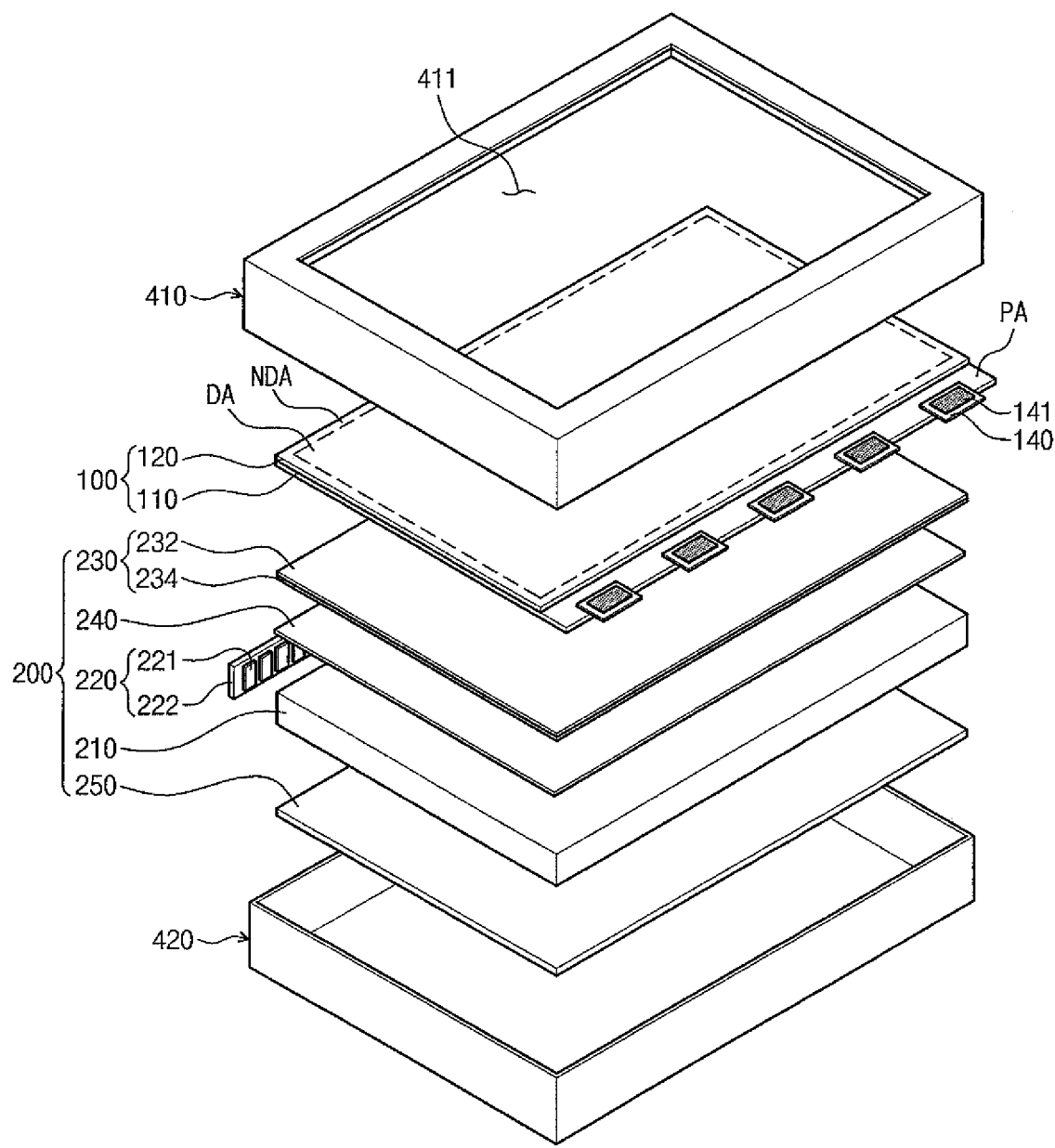
FIG. 1 is an exploded perspective view showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items. Also, in the drawings, the sizes and relative sizes of layers and regions may be exaggerated for clarity.

The terminology used herein is for the purpose of describing particular embodiments only and is not intended to be limiting of exemplary embodiments of the invention. As used herein, the singular forms, "a", "an" and "the" are intended to include the plural forms as well, unless the context clearly indicates otherwise.

Hereinafter, exemplary embodiments of the present invention will be explained in detail with reference to the accompanying drawings.

FIG. 1 is an exploded perspective view showing a display apparatus according to an exemplary embodiment of the present invention.

Referring to FIG. 1, a display apparatus includes, for example, a display panel 100, a backlight unit 200, an upper cover 410, and a lower cover 420.

The display panel 100 may be various display panels, such as, for example, a liquid crystal display panel, an electrophoretic display panel, an electrowetting display panel, etc. In the present exemplary embodiment, as a representative example, the liquid crystal display panel will be described as the display panel 100.

The display panel 100 has, for example, a rectangular shape with long sides and short sides and includes a display area DA in which an image is displayed, a non-display area NDA disposed adjacent to the display area DA, and a pad area PA extended from at least one side of the non-display area NDA. In addition, the display panel 100 includes, for example, an array substrate 110, an opposite substrate 120 facing the array substrate 110, and a liquid crystal layer (not shown) interposed between the array substrate 110 and the opposite substrate 120. The display panel 100 further includes, for example, polarizing films (not shown) respectively attached to its outer surfaces, i.e., an outer surface of the array substrate 110 and an outer surface of the opposite substrate 120.

The array substrate 110 includes, for example, a plurality of pixels (not shown) arranged in the display area DA in a matrix form. Each pixel includes, for example, a plurality of sub-pixels having different colors from each other. For instance, each sub-pixel has a red, green, blue, yellow, or white color. Thus, a light exiting from each sub-pixel has one of, for example, the red, green, blue, yellow, or white colors. In addition, each pixel includes, for example, a gate line (not shown), a data line (not shown) insulated from the gate line while crossing the gate line, and a pixel electrode (not shown). Further, each pixel includes, for example, a thin film transistor (not shown) electrically connected to the gate line, the data line, and the pixel electrode. The thin film transistor switches a driving signal applied to the pixel electrode.

A seal pattern (not shown) is, for example, disposed in the non-display area NDA of the array substrate 110 to couple the array substrate 110 to the opposite substrate 120.

A flexible circuit board 140 on which a driver IC 141 is mounted is, for example, connected to the pad area PA of the array substrate 110, and the flexible printed circuit board 140 is connected to an external circuit module (not shown). For example, the driver IC 141 is applied with various control signals from the external circuit module and applies the driving signal driving the display panel 100 to the thin film transistor in response to the various control signals.

The opposite substrate 120 includes, for example, color filters (not shown), each of which realizes a predetermined color using the light provided from the backlight unit 200, and a common electrode (not shown) disposed on the color filters to face the pixel electrode. Each color filter has, for example, one of the red, green, blue, yellow or white colors and is formed by a deposition or coating process. Meanwhile, in the present exemplary embodiment, the color filters are disposed on the opposite substrate 120, but exemplary embodiments are not limited thereto or thereby. For example, alternatively in an exemplary embodiment, the color filters may be disposed on the array substrate 110.

The liquid crystal layer includes liquid crystal molecules arranged in a specific direction in response to an electric field generated by voltages respectively applied to the pixel electrode and the common electrode, and thus the liquid crystal layer controls a transmittance of the light passing through the liquid crystal molecules, thereby displaying desired images.

The backlight unit 200 is disposed at, for example, an opposite direction to a direction in which the light exiting from the display panel 100 travels. The backlight unit 200 includes, for example, a light guide plate 210, a light source unit 220 including a plurality of light sources, an optical member 230, a quantum dot sheet 240, and a reflective sheet 250.

The light guide plate 210 is disposed under the display panel 100 and guides the light emitted from the light source unit 220 to the display panel 100. For example, the light guide plate 210 is overlapped with at least the display area DA of the display panel 100. The light guide plate 210 includes, for example, an exit surface from which the light exits, a lower surface facing the exit surface, and side surfaces connecting the exit surface and the lower surface. For example, at least one of the side surfaces faces the light source unit 220 to serve as a light incident surface into which the light emitted from the light source unit 220 is incident, and a side surface facing the light incident surface serves as a light reflective surface to reflect the light. Moreover, the light guide plate 210 may be formed of, for example, a resin based material such as polymethylmethacrylate (PMMA), a polyethylene terephthalate (PET) resin, a polycarbonate (PC) resin, a cyclic olefin copolymer (COC) resin, and a polyethylene naphthalate (PEN) resin.

The light source unit 220 includes, for example, a printed circuit board 222 and the light sources 221, (e.g., light emitting diodes (LEDs), elongated cold cathode fluorescent lamp (CCFLs), or flat fluorescent lamps (FFLs)) mounted on the printed circuit board 222. Here, the light sources 221 emit lights having, for example, the same color. For instance, the light sources 221 may emit lights having a wavelength within a range from about 440 nm to about 460 nm and having a full-width half-maximum equal to or less than about 45 nm. For example, the light sources 221 may emit the blue color.

For example, the light source unit 220 is disposed to emit the light while facing at least one side surface of the light guide plate 210 and provides the light to the liquid crystal display panel 100 through the light guide plate 210.

The optical member 230 is disposed, for example, between the light guide plate 210 and the display panel 100. The optical member 230 controls the light exiting through the light guide plate 210 from the light source unit 220. In addition, the optical member 230 includes, for example, a prism sheet 234 and a protective sheet 232, which are sequentially stacked.

For example, the prism sheet 234 condenses the light to travel in a direction substantially vertical to the display panel 100. The light exiting from the prism sheet 234 is, for example, vertically incident into the display panel 100.

The protective sheet 232 is, for example, disposed on the prism sheet 234 to protect the prism sheet 234 from external impacts. The protective sheet 232 may, for example, transmit the light that passes through the prism sheet 234.

In the present exemplary embodiment, the optical member 230 includes, for example, one prism sheet 234 and one protective sheet 232, but exemplary embodiments of the present invention are not limited thereto or thereby. For example, alternatively in an exemplary embodiment, at least one of the prism sheet 234 and the protective sheet 232 may be provided in plural number, or one of the prism sheet 234 and the protective sheet 232 may be omitted from the optical member 230. Although not shown in figures, the optical member 230 may further include, for example, a diffusion sheet between the prism sheet 234 and the light guide plate 210.

For example, the quantum dot sheet 240 converts a color of the light emitted from the light sources 221 and exiting through the light guide plate 210. For instance, in a case that all of the light sources 221 emit a blue light, the quantum dot sheet 240 may emit a white light. The white light is obtained, for example, by mixing the blue light, a red light, and a green light. The blue light exiting from the quantum dot sheet 240 may be, for example, the same as the blue light incident to the quantum dot sheet 240. In addition, the green light and the red light exiting from the quantum dot sheet 240 are obtained by, for example, the quantum dot sheet 240 as the quantum dot sheet 240 partially absorbs the blue light.

The reflective sheet 250 is disposed under the light guide plate 210 and reflects the light leaked from the light guide plate 210 without being directed to the display panel 100 to change a path of the light leaked from the light guide plate 210 to the display panel 100. The reflective sheet 250 includes, for example, a light reflective material to reflect the light. For example, in an exemplary embodiment, reflective sheet 250 may be formed of, polyethylene terephthalate (PET) or aluminum. Alternatively, in an exemplary embodiment, the reflective sheet 250 may include other materials such as, for example, polybutylene terephthalate (PBT) or a resin such as polycarbonate (PC) blended in polyethylene terephthalate (PET) or polybutylene terephthalate (PBT).

The reflective sheet 250 is, for example, disposed on the lower cover 420 and reflects the light emitted from the light source unit 220. As a result, the reflective sheet 250 increases an amount of the light provided to the display panel 100.

In the present exemplary embodiment, the light source unit 220 is, for example, disposed to provide the light to the side surface of the light guide plate 210, but exemplary embodiments of the present invention are not be limited thereto or thereby. For example, alternatively in an example embodiment, the light source unit 220 may be disposed to provide the light to the lower surface of the light guide plate 210. In addition, in a case that the light guide plate 210 is omitted from the backlight unit 200, the light source unit 220 may, for example, be disposed under the display panel 100, and thus the light emitted from the light source unit 220 may be directly provided to the display panel 100.

The upper cover 410 is disposed, for example, on the display panel 100. The upper cover 410 is provided with, for example, a display window 411 formed therethrough to expose the display area DA of the display panel 100. The upper cover 410 is, for example, coupled with the lower cover 420 to support a front edge portion of the display panel 100.

The lower cover 420 is disposed, for example, under the backlight unit 200. The lower cover 420 provides a space to accommodate the display panel 100 and the backlight unit 200 therein. In addition, the lower cover 420 is, for example, coupled with the upper cover 410 to accommodate the display panel 100 and the backlight unit 200 therein.

Figure 2:
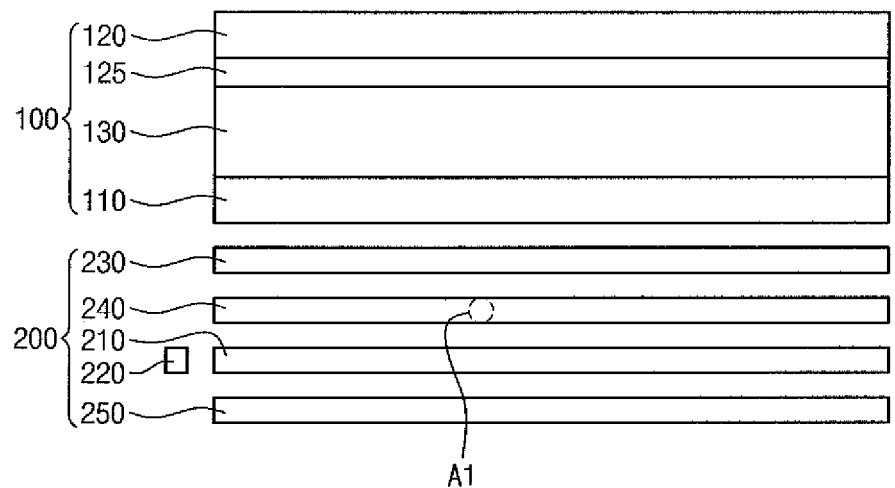
FIG. 2 is a cross-sectional view showing a display panel and a backlight unit shown in FIG. 1.
Figure 3:
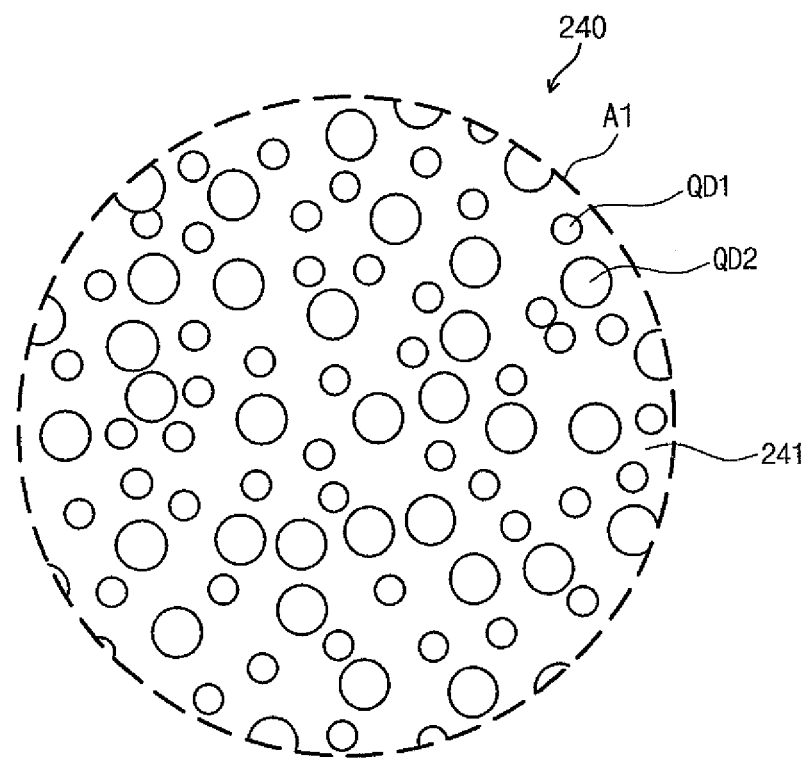
FIG. 3 is an enlarged view showing a portion A1 of a quantum dot sheet of FIG. 2.

FIG. 2 is a cross-sectional view showing the display panel and the backlight unit of FIG. 1, and FIG. 3 is an enlarged view showing a portion A1 of the quantum dot sheet of FIG. 2.

Referring to FIGS. 2 and 3, the backlight unit 200 provides the light to the display panel 100, so that the display panel 100 displays the image thereon using the light from the backlight unit 200.

The display panel 100 includes, for example, the array substrate 110, the opposite substrate 120 having the color filter 125 disposed on a surface thereof to face the array substrate 110, and the liquid crystal layer 130 interposed between the array substrate 110 and the opposite substrate 120.

The backlight unit 200 is disposed, for example, under the display panel 100 to provide the light to the display panel 100. The backlight unit 200 includes, for example, the light guide plate 210, the light source unit 220 providing the light to the light guide plate 210, the quantum dot sheet 240 converting the color of the light emitted from the light guide plate 210, the optical member 230, and the reflective sheet 250.

The quantum dot sheet 240 converts the color of the light exiting through the light guide plate 210 after being emitted from the light source unit 220. For instance, when the blue light is provided from the light source unit 220 to the light guide plate 210, the light exiting through the light guide plate 210 is the blue light. The light exiting from the light guide plate 210 may be converted to the white light by, for example, the quantum dot sheet 240.

The quantum dot sheet 240 includes, for example, a polymer resin 241 and a plurality of quantum dots QD1 and QD2 dispersed in the polymer resin 241.

The polymer resin 241 is formed of, for example, an insulating polymer resin, such as, silicon resin, epoxy resin, or acrylic resin, etc.

The quantum dots QD1 and QD2 have, for example, a spherical shape with a diameter in a range from about several nanometers to tens of nanometers, or to hundreds of nanometers. In addition, the quantum dots QD1 and QD2 are, for example, nanomaterials and include a core having a narrow band gap, a shell with a wide band gap and surrounding the core, and a ligand attached onto the shell.

A quantum confinement effect occurs in the quantum dots QD1 and QD2, which are nano-sized, and a significant feature of the quantum confinement effect is a band gap structure in that the band gap is relatively large and discontinuous like an individual atom, which is different from the crystal structure of bulk. The quantum dots QD1 and QD2 control a size of the discontinuous band gap according to a size of the quantum dots QD1 and QD2. Therefore, when the quantum dots QD1 and QD2 are synthesized to have a uniform size distribution, an optical conversion device, which has, for example, a spectral distribution with a small full-width half-maximum, may be formed. For example, as the size of the quantum dots QD1 and QD2 increases, the wavelength of light generated from the quantum dots QD1 and QD2 becomes longer, and thus the wavelength of the light is controlled by adjusting the size of the quantum dots QD1 and QD2.

The quantum dots QD1 and QD2 absorb the light exiting from the light guide plate 210 and emit the light having, for example, the wavelength corresponding to the band gap thereof.

For example, assuming that the light emitted from the light source unit 220 is referred to as a first light and the light emitted from the quantum dots QD1 and QD2 is referred to as a second light, the wavelength of the first light is equal to or shorter than the wavelength of the second light. According to Energy Law, the quantum dots QD1 and QD2 may not emit the light having a greater energy than the energy of the light absorbed therein, and thus the wavelength of the second light is equal to or longer than the wavelength of the first light.

For example, the quantum dots QD1 and QD2, may include II-VI group quantum dots, such as, ZnS, ZnSe, ZnTe, CdS, CdSe, CdTe, HgS, HgSe, and HgTe and III-V group quantum dots, such as, PbS, PbSe, PbTe, AlN, AlP, AlAs, AlSb, GaN, GaAs, GaSb, InN, InP, InAs, and InSb. In addition, in an exemplary embodiment, the quantum dots QD1 and QD2 may also include Group IV-VI-group quantum dots such as, for example, SbTe.

In a case that the light sources 221 of the light source unit 220 are blue light emitting diodes, the quantum dot sheet 240 includes, for example, at least one of first quantum dots QD1 used to emit the green light and second quantum dots QD2 used to emit the red light. The second quantum dots QD2 have a diameter, for example, that is greater than that of the first quantum dots QD1.

In FIG. 3, the quantum dot sheet 240 includes, for example, the first quantum dots QD1 and the second quantum dots QD2. In the case that the quantum dot sheet 240 includes the first and second quantum dots QD1 and QD2 as shown in FIG. 3, the light exiting from the quantum dot sheet 240 may be, for example, the white light obtained by mixing the red, green, and blue colors.

Hereinafter, a method of realizing a full-color image using the light emitted from the backlight unit will be described in detail.

For example, the light source unit 220 of the backlight unit 200 provides the first light to the light guide plate 210, the first light enters into the light guide plate 210 through the light incident surface of the light guide plate 210, and the first light entered into the light guide plate 210 exits from the exit surface of the light guide plate 210 to travel to the display panel 100. Here, the first light is, for example, the blue light. Also, the light incident surface is, for example, the side surface of the light guide plate 210, which faces the light source unit 220, and the exit surface of the light guide plate 210 faces the display panel 100.

The first light exiting from the light guide plate 210 is provided to the quantum dot sheet 240. The quantum dot sheet 240, for example, converts the color of the first light and emits the second light having a different color from the first light.

For example, a portion of the first light provided to the quantum dot sheet 240 transmits through the polymer resin 241 without being absorbed into the first quantum dots QD1 and the second quantum dots QD2. Thus, the first light that transmits through the polymer resin 241 may be, for example, the blue light that is the same as the first light.

In addition, for example, another portion of the first light is absorbed into the first quantum dots QD1, and the first quantum dots QD1 convert the first light absorbed therein to emit the light having the wavelength corresponding to the band gap of the first quantum dots QD1. For instance, the first quantum dots QD1 absorb the first light, which is the blue light, and emit the green light. In this case, the wavelength of the green light corresponds to, for example, the inherent band gap of the first quantum dots QD1, and the full-width half-maximum of the green light decreases as the size of the first quantum dots QD1 becomes more uniform.

Further, for example, the other portion of the first light is absorbed into the second quantum dots QD2, and the second quantum dots QD2 convert the first light absorbed therein to emit the light having the wavelength corresponding to the band gap of the second quantum dots QD2. For instance, the second quantum dots QD2 absorb the first light, which is the blue light, and emit the red light. The wavelength of the red light corresponds to, for example, the inherent band gap of the second quantum dots QD2, and the full-width half-maximum of the red light decreases as the size of the second quantum dots QD2 becomes more uniform.

Therefore, the second light emitted from the quantum dot sheet 240 may be, for example, the white light obtained by mixing the blue light, the green light, and the red light.

The second light exiting from the quantum dot sheet 240 is provided to the optical member 230. The optical member 230 controls the second light to allow the second light to travel in a direction, for example, substantially vertical to the display panel 100.

The display panel 100 displays the images using the second light.

For example, when a driving signal is applied to a thin film transistor of the array substrate 110, the thin film transistor provides the driving signal to a pixel electrode. The pixel electrode applied with the driving signal forms an electric field with an opposite electrode to the pixel electrode. Liquid crystal molecules in the liquid crystal layer 130 are realigned according to the electric field.

Due to the realignment of the liquid crystal molecules, a portion of the pixels transmits the second light, and the other portion of the pixels blocks the second light.

The second light passing through the liquid crystal layer 130 transmits the color filter 125 to have the red, green, or blue color.

Accordingly, the display apparatus may realize the full-color image. The full-color image realized by the display apparatus is sharp and clear as the red, green, and blue colors of the second light provided to the color filter have relatively narrow full-width half-maximum values.

Figure 4:
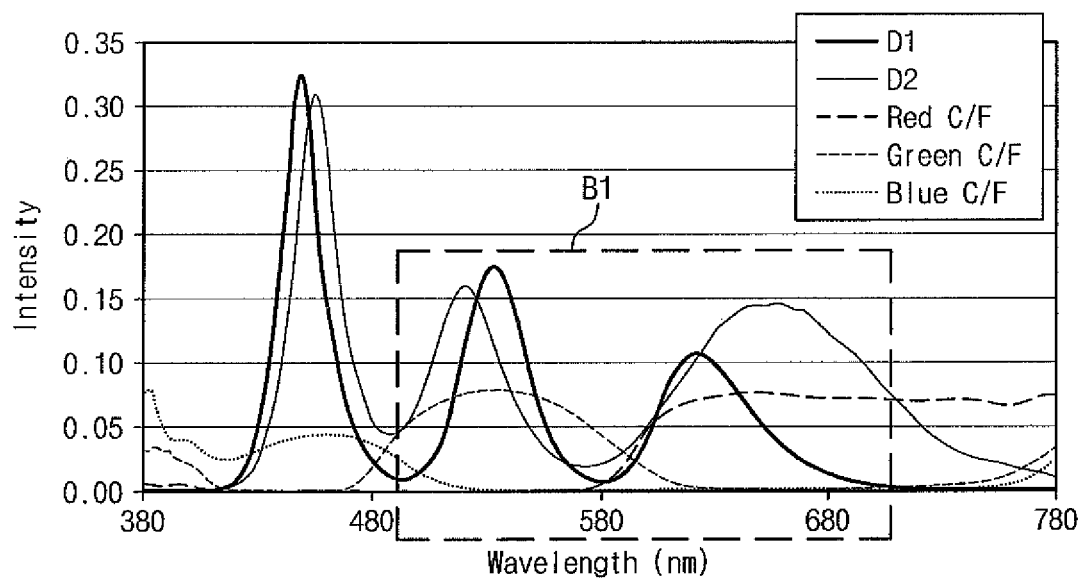
FIG. 4 is a graph showing a wavelength distribution of a light transmitting through a quantum dot sheet shown in FIG. 2, a wavelength distribution of a light emitted from a backlight unit having RGB light emitting diodes, and a wavelength distribution of a light transmitting through the color filter.
Figure 5:
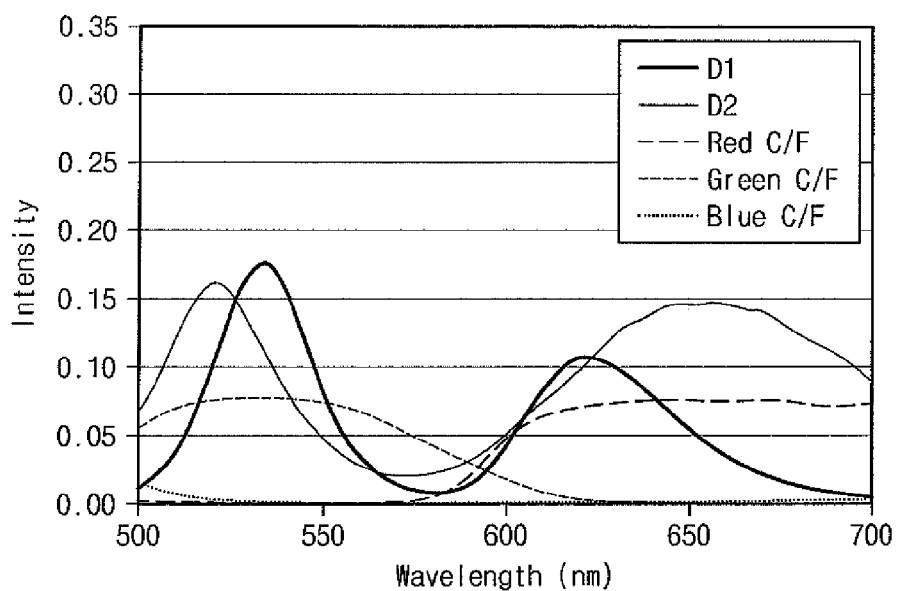
FIG. 5 is an enlarged graph showing a portion B1 of FIG. 4.

FIG. 4 is a graph showing a wavelength distribution of a light D1 transmitting through the quantum dot sheet of FIG. 2, a wavelength distribution of a light D2 emitted from a backlight unit having RGB light emitting diodes, and a wavelength distribution of a light transmitting through the color filter, and FIG. 5 is an enlarged graph showing a portion B1 of FIG. 4.

Referring to FIGS. 4 and 5, the quantum dot sheet receives the light from the light guiding plate and emits the blue light, the green light, and the red light. The blue light is emitted from the light source unit of the backlight unit and passes through the polymer resin of the quantum dot sheet, the green light is emitted from the first quantum dots of the quantum dot sheet, and the red light is emitted from the second quantum dots of the quantum dot sheet.

As shown in FIG. 4, the blue light exiting from the quantum dot sheet is the same as the blue light emitted from the light source unit and has a center wavelength of about 457 nm and a full-width half-maximum of about 45 nm. Also, the green light exiting from the quantum dot sheet is the same as the light emitted from the first quantum dots and has a center wavelength of about 531 nm and a full-width half-maximum of about 32 nm. The red light exiting from the quantum dot sheet is the same as the light emitted from the second quantum dots and has a center wavelength of about 629 nm and a full-width half-maximum of about 35 nm.

In addition, as shown in FIG. 5, the full-width half-maximum of the red light and the green light exiting from the quantum dot sheet is relatively smaller than the full-width half-maximum of the red light and the green light emitted from the backlight unit having RGB light emitting diodes.

Further, the center wavelength of the green light exiting from the quantum dot sheet is closer to the center wavelength of the light transmitting through the green color filter disposed on the display panel than the center wavelength of the green light emitted from the backlight unit having the RGB light emitting diodes.

Thus, the display apparatus that employs the quantum dot sheet provides a sharper and clearer image than that of the display apparatus that does not employ the quantum dot sheet.

Figure 6:
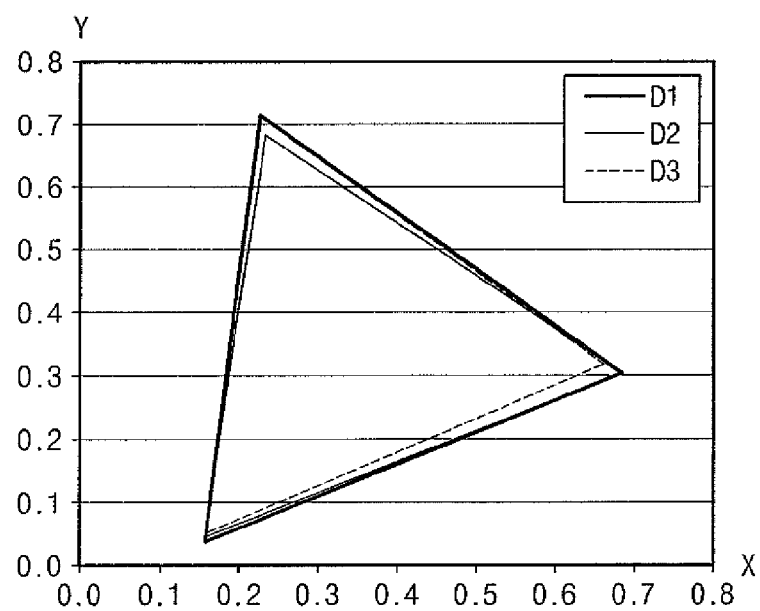
FIG. 6 is a graph showing a color coordinate distribution of a light transmitting through the quantum dot sheet shown in FIG. 2, a color coordinate distribution of a light emitted from a backlight unit having RGB light emitting diodes, and an Adobe RGB color space.

FIG. 6 is a graph showing a color coordinate distribution of the light D1 transmitting through the quantum dot sheet of FIG. 2, a color coordinate distribution of a light D2 emitted from a backlight unit having RGB light emitting diodes, and an Adobe RGB color space D3. Table 1 shown below represents a color coordinate of the light D1 that transmits through the quantum dot sheet 240 and a color coordinate of the light D2 emitted from the backlight unit having RGB light emitting diodes.

Referring to FIG. 6 and Table 1, the color coordinate distribution of the light that transmits through the quantum dot sheet is wider than the Adobe RGB color space D3. That is, the color coordinate distribution of the light D1 that transmits through the quantum dot sheet is equal to the Adobe RGB color space D3, e.g., almost 100%.

On the contrary, the color coordinate distribution of the light D2 emitted from the backlight unit having the RGB light emitting diodes is not equal to the Adobe RGB color space D3. Especially, the color coordinate distribution of the light D2 emitted from the backlight unit having the RGB light emitting diodes is not equal to the Adobe RGB color space D3 in the green light area. Thus, a concordance rate between the color coordinate distribution of the light D2 emitted from the backlight unit having the RGB light emitting diodes and the Adobe RGB color space D3 is less than about 100%. For example, as the full-width half-maximum of the green light increases, the concordance rate between the color coordinate distribution of the light D2 emitted from the backlight unit having the RUB light emitting diodes and the Adobe RGB color space D3 decreases. For instance, when the full-width half-maximum of the green light is about 35 nm, the concordance rate between the light D2 emitted from the backlight unit having the RGB light emitting diodes and the Adobe RGB color space D3 is about 96.5%.

Therefore, the display apparatus employing the quantum dot sheet has a higher concordance rate with the Adobe RGB color space than the display apparatus that does not employ the quantum dot sheet. In addition, the display apparatus employing the quantum dot sheet has a higher color reproducibility than the display apparatus that does not employ the quantum dot sheet.

TABLE 1

| Color coordinate | D1 X axis | D1 Y axis | D2 X axis | D2 Y axis |
|---|---|---|---|---|
| White | 0.314 | 0.329 | 0.311 | 0.330 |
| Red | 0.383 | 0.307 | 0.685 | 0.306 |
| Green | 0.214 | 0.681 | 0.208 | 0.715 |
| Blue | 0.147 | 0.052 | 0.149 | 0.044 |
| Concordance rate with Adobe RGB color space | 96.5 | | 100 | |

Table 2 shown below represents a concordance rate between the color coordinate distribution of the light exiting from the quantum dot sheet and the Adobe RGB color space according to the wavelength and the full-width half-maximum of the green light emitted from the first quantum dots of the quantum dot sheet. Here, the blue light has a wavelength of about 457 nm and a full-width half-maximum of about 45 nm. Also, the red light has a wavelength of about 631 nm and a full-width half-maximum of about 34 nm.

TABLE 2

| | | Full-width half-maximum | | | | | | | | | |
|---|---|---|---|---|---|---|---|---|---|---|---|
| | | 23 | 24 | 25 | 26 | 27 | 28 | 29 | 30 | 31 | 32 |
| Wavelength | 529 | 99.80 | 99.80 | 99.70 | 99.70 | 99.60 | 99.50 | 99.40 | 99.40 | 99.40 | 99.20 |
| | 530 | 100.00 | 99.90 | 99.90 | 99.90 | 99.80 | 99.70 | 99.70 | 99.60 | 99.70 | 99.50 |
| | 531 | 100.00 | 100.00 | 100.00 | 100.00 | 100.00 | 99.90 | 99.90 | 99.90 | 99.90 | 99.70 |
| | 532 | 100.00 | 100.00 | 100.00 | 99.90 | 100.00 | 100.00 | 100.00 | 100.00 | 99.60 | 99.70 |

TABLE 2-continued

|  | Full-width half-maximum | | | | | | | | | |
| --- | --- | --- | --- | --- | --- | --- | --- | --- | --- | --- |
|  | 23 | 24 | 25 | 26 | 27 | 28 | 29 | 30 | 31 | 32 |
| 533 | 100.00 | 100.00 | 100.00 | 99.90 | 100.00 | 99.80 | 99.50 | 99.30 | 98.50 | 98.80 |
| 534 | 99.90 | 99.60 | 99.40 | 99.40 | 99.30 | 98.60 | 98.40 | 98.10 | 97.30 | 97.70 |
| 535 | 98.60 | 98.40 | 98.20 | 99.00 | 99.00 | 97.40 | 97.20 | 96.90 | 96.10 | 96.50 |

Referring to the Table 2, as the full-width at half-maximum of the green light emitted from the first quantum dots is decreased, the concordance rate between the Adobe RGB color space and the color coordinate distribution of the light exiting from the quantum dot sheet increases. Particularly, in a case that the center wavelength of the green light emitted from the first quantum dots is within a range from about 530 nm to about 534 nm, the concordance rate between the Adobe RGB color space and the color coordinate distribution of the light exiting from the quantum dot sheet becomes more than about 99.90%.

In particular, when the wavelength of the green light is about 531 nm and the full-width half-maximum is equal to or less than about 31 nm, the concordance rate between the color coordinate distribution of the light exiting from the quantum dot sheet and the Adobe RGB color space is equal to or larger than about 99.90%.

In addition, in the case that the wavelength of the green light is about 532 nm and the full-width half-maximum is equal to or less than about 30 nm, the concordance rate between the color coordinate distribution of the light exiting from the quantum dot sheet and the Adobe RGB color space is equal to larger than about 99.90%.

Meanwhile, a center wavelength of a light passing through the green color filter included in a conventional display panel is within a range from about 500 nm to about 560 nm. Thus, the center wavelength of the green light overlaps with the center wavelength of the light passing through the green color filter by about 10%.

Table 3 shown below represents a concordance rate between the color coordinate distribution of the light exiting from the quantum dot sheet and the Adobe RGB color space according to the wavelength and the full-width half-maximum of the red light emitted from the second quantum dots of the quantum dot sheet. Here, the blue light has the wavelength of about 457 mm and the full-width half-maximum of about 45 nm, and the green light has the wavelength of about 531 nm and the full-width half-maximum of about 31 nm.

TABLE 3

|  | FWHM | | | |
| --- | --- | --- | --- | --- |
| Wavelength | 32 | 33 | 34 | 35 |
| 629 | 99.90 | 99.90 | 99.80 | 99.80 |
| 630 | 99.90 | 99.90 | 99.90 | 99.90 |
| 631 | 99.90 | 99.90 | 99.90 | 99.90 |
| 632 | 99.90 | 99.90 | 99.90 | 99.90 |
| 633 | 99.90 | 99.90 | 99.90 | 99.90 |
| 634 | 99.90 | 99.90 | 99.90 | 99.90 |
| 635 | 99.90 | 99.90 | 99.90 | 99.00 |

Referring to Table 3, as the full-width half-maximum of the red light decreases, the concordance rate between the color coordinate distribution of the light exiting from the quantum dot sheet and the Adobe RGB color space becomes equal to or larger than about 99.90% in a wide wavelength area of the red light.

In addition, as the wavelength of the red light exiting from the quantum dot sheet becomes longer, the concordance rate between the color coordinate distribution of the light exiting from the quantum dot sheet and the Adobe RGB color space becomes equal to or larger than about 99.90%. This is because the wavelength area of the red light is wider than the wavelength area of the other color lights.

Meanwhile, a center wavelength of light passing through a red color filter included in the conventional display panel is within a range from about 600 nm to about 780 nm. Thus, the center wavelength of the red light exiting from the quantum dot sheet overlaps with the center wavelength of the light passing through the red color filter by about 70%.

Figure 7:
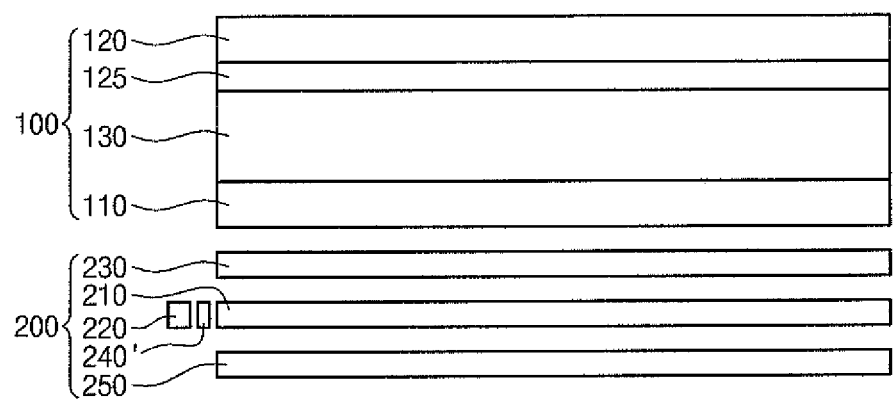
FIG. 7 is a cross-sectional view showing a display apparatus according to an exemplary embodiment of the present invention.

FIG. 7 is a cross-sectional view showing a display apparatus according to an exemplary embodiment of the present invention. In FIG. 7, the same reference numerals denote the same elements in FIGS. 1 to 6, and thus detailed descriptions of the same elements will be omitted in order to avoid redundancy.

Referring to FIG. 7, a display apparatus includes, for example, a backlight unit 200 providing a light to a display panel 100, and the display panel 100 displaying an image thereon.

The display panel 100 includes, for example, an array substrate 110, an opposite substrate 120 having a color filter 125 disposed on a surface thereof to face the array substrate 110, and a liquid crystal layer 130 interposed between the array substrate 110 and the opposite substrate 120.

The backlight unit 200 is disposed, for example, under the display panel 100 and provides the light to the display panel 100. The backlight unit 200 includes, for example, a light guide plate 210, a light source unit 220 emitting the light to the light guide plate 210, a quantum dot sheet 240' disposed between the light guide plate 210 and the light source unit 220, an optical member 230, and a reflective sheet 250. The light source unit 220 emits, for example, a blue light.

The quantum dot sheet 240' converts a color of the light exiting through the light guide plate 210 after being emitted from the light source unit 220. For instance, the quantum dot sheet 240 includes a transparent polymer resin and first quantum dots and second quantum dots, which are dispersed in the polymer resin.

The transparent polymer resin transmits, for example, a first light (e.g. blue light) exiting from the light guide plate 210 and provides the first light (e.g. the blue light) to the quantum dot sheet 240'. The first quantum dots absorb, for example the first light and emit a light having a different color from the first light, e.g., a green light. Also, the second quantum dots absorb, for example the first light and emit a light having a different color from the first light, e.g., a red light.

Therefore, the quantum dot sheet 240' may emit, for example, a white light obtained by mixing the blue light, the green light, and the red light.

The optical member 230 includes, for example, a diffusion sheet, a prism sheet, and a protective sheet.

The diffusion sheet diffuses the light exiting from the light guide plate 210. The diffusion sheet diffuses the light, so that an amount of the light provided to the display panel 100 may be uniform.

The prism sheet condenses the light diffused by the diffusion sheet to allow the light to travel in a direction, for example, substantially vertical to the display panel 100.

The protective sheet is disposed, for example, on the prism sheet to protect the prism sheet from external impacts and the protective sheet transmits the light that passes through the prism sheet.

Having described example embodiments of the present invention, it is further noted that it is readily apparent to those of ordinary skill in the art that various modifications may be made without departing from the spirit and scope of the invention which is defined by the metes and bounds of the appended claims.

What is claimed is:

1. A backlight unit comprising:
a light source unit including a light source configured to emit a first light;
a quantum dot sheet configured to emit a second light having a different color from the first light;
a light guide plate configured to guide a light exiting from the light source unit or the quantum dot sheet; and
an optical member including a prism sheet and configured to control the light exiting from the light guide plate,
wherein the quantum dot sheet comprises a polymer resin and a plurality of first quantum dots and a plurality of second quantum dots, which are dispersed in the polymer resin,
wherein the second light is a white light obtained by mixing a red light, a green light, and a blue light,
wherein the second light has a concordance rate with an Adobe RGB color space, which is no less than about 99.9%,
wherein the first light has a center wavelength of 457 nm and a full-width half-maximum of 45 nm, and
wherein the first quantum dots are configured to emit light having a center wavelength of 531 nm and a full-width half-maximum of 32 nm and the second quantum dots are configured to emit light having a center wavelength of 629 nm and a full-width half-maximum of 35 nm.

2. The backlight unit of claim 1, wherein the quantum dot sheet is disposed between the light guide plate and the optical member.

3. The backlight unit of claim 1, wherein the quantum dot sheet is disposed between the light guide plate and the light source unit.

4. The backlight unit of claim 3, wherein the optical member is disposed on the light guide plate.

5. The backlight unit of claim 4, wherein the optical member further comprises a diffusion sheet disposed between the light guide plate and the prism sheet.

6. A display apparatus comprising:
a display panel; and
a backlight unit configured to provide a light to the display panel, the backlight unit comprising:
a light source unit including a light source configured to emit a first light;
a quantum dot sheet configured to emit a second light having a different color from the first light;
a light guide plate configured to guide a light exiting from the light source unit or the quantum dot sheet to the display panel; and
an optical member including a prism sheet and configured to control the light exiting from the light guide plate,
wherein the quantum dot sheet comprises a polymer resin and a plurality of first quantum dots and a plurality of second quantum dots, which are dispersed in the polymer resin,
wherein the second light is a white light obtained by mixing a red light, a green light, and a blue light,
wherein the second light has a concordance rate with an Adobe RGB color space, which is no less than about 99.90%,
wherein the first light has a center wavelength of 457 nm and a full-width half-maximum of 45 nm, and
wherein the first quantum dots are configured to emit light having a center wavelength of 531 nm and a full-width half-maximum of 32 nm and the second quantum dots are configured to emit light having a center wavelength of 629 nm and a full-width half-maximum of 35 nm.

7. The display apparatus of claim 6, wherein the quantum dot sheet is disposed between the light guide plate and the display panel.

8. The display apparatus of claim 6, wherein the quantum dot sheet is disposed between the light guide plate and the light source unit.

9. The display apparatus of claim 8, wherein the optical member is disposed between the light guide plate and the display panel.

10. The display apparatus of claim 9, wherein the optical member further comprises a diffusion sheet disposed between the light guide plate and the prism sheet.

11. A display apparatus comprising:
a display panel; and
a backlight unit configured to provide a light to the display panel, the backlight unit comprising:
a light source unit including a light source configured to emit a first light;
a quantum dot sheet configured to emit a second light having a different color from the first light;
a light guide plate configured to guide a light exiting from the light source unit or the quantum dot sheet to the display panel; and
an optical member including a prism sheet and configured to control the first light exiting from the light guide plate;
wherein the quantum dot sheet comprises a polymer resin and a plurality of first quantum dots and a plurality of second quantum dots, which are dispersed in the polymer resin,
wherein a center wavelength range of a red light emitted by the quantum dot sheet overlaps with a center wavelength of a light transmitting through a red color filter disposed on the display panel by no less than about 70%,
wherein a center wavelength range of a green light emitted by the quantum dot sheet overlaps with a center wavelength of a light transmitting through a green color filter disposed on the display panel by no greater than about 10%,
wherein the first light has a center wavelength of 457 nm and a full-width half-maximum of 45 nm, and
wherein the first quantum dots are configured to emit light having a center wavelength of 531 nm and a full-width half-maximum of 32 nm and the second quantum dots are configured to emit light having a center wavelength of 629 nm and a full-width half-maximum of 35 nm.

* * * * *